(12) United States Patent
Agrawal et al.

(10) Patent No.: US 9,094,872 B2
(45) Date of Patent: Jul. 28, 2015

(54) ENHANCED RESOURCE MANAGEMENT FOR A NETWORK SYSTEM

(75) Inventors: Dakshi Agrawal, Monsey, NY (US); Ting He, Piermont, NY (US); Ramya Raghavendra, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 613 days.

(21) Appl. No.: 13/357,204

(22) Filed: Jan. 24, 2012

(65) Prior Publication Data

US 2013/0190026 A1 Jul. 25, 2013

(51) Int. Cl.
| | |
|---|---|
| H04B 7/00 | (2006.01) |
| H04W 28/16 | (2009.01) |
| H04W 28/06 | (2009.01) |
| H04W 28/20 | (2009.01) |

(52) U.S. Cl.
CPC ............ *H04W 28/16* (2013.01); *H04W 28/06* (2013.01); *H04W 28/20* (2013.01)

(58) Field of Classification Search
CPC ... H04W 28/08; H04W 28/085; H04W 28/16; H04W 28/18; H04W 28/22; H04W 28/26
USPC .................................. 455/450–453, 507, 509
See application file for complete search history.

(56) References Cited

U.S. PATENT DOCUMENTS

| | | | | |
|---|---|---|---|---|
| 6,473,467 B1 * | 10/2002 | Wallace et al. | .............. | 375/267 |
| 7,355,960 B2 * | 4/2008 | Kang et al. | .................... | 370/208 |
| 8,391,206 B2 * | 3/2013 | Alexiou et al. | .............. | 370/328 |
| 2004/0077319 A1 | 4/2004 | Koike et al. | | |
| 2005/0254465 A1 * | 11/2005 | Lundby et al. | ................ | 370/335 |
| 2008/0123547 A1 * | 5/2008 | Palanki | .......................... | 370/252 |
| 2008/0240216 A1 * | 10/2008 | Kolding et al. | ............... | 375/227 |
| 2010/0238840 A1 | 9/2010 | Lu et al. | | |

FOREIGN PATENT DOCUMENTS

| | | |
|---|---|---|
| WO | WO02054625 A2 | 7/2002 |
| WO | WO2010000338 A1 | 1/2010 |

OTHER PUBLICATIONS

Digital Communications Knowledge Transfer Network; Energy Efficient Wireless Communications (Green Radio Access Networks); Wireless Technology & Spectrum Working Group—pp. 1-52; Mar. 2011.

(Continued)

*Primary Examiner* — Raymond Dean
(74) *Attorney, Agent, or Firm* — Cantor Colburn LLP

(57) ABSTRACT

According to exemplary embodiments, a method for resource management of network systems includes sampling channel states of a first set of channels from at least one base station associated with a radio network controller providing an application and estimating channel states of a second set of channels from the at least one base station, wherein the estimated channel states are based on previously sampled channel states and currently sampled channel states. The method further includes adapting at least one runtime parameter of the application based on the sampled channel states of the first set of channels and the estimated channel states of the second set of channels.

20 Claims, 7 Drawing Sheets

(56) References Cited

OTHER PUBLICATIONS

"Cloud Computing: Benefits and Risks of Moving Federal IT into the Cloud", Testimony of Cita M. Furlani, Director, Information Technology Laboratory, National Institute of Standards and Technology, United States Department of Commerce, United States House of Representatives Committee on Oversight and Government Reform, Jul. 1, 2010.

Author: Siemens Technik Report—Michael Farber; IP No. IPCOM000018540D Original Publication Date: Sep. 1, 2002; IP.com Electronic Publication: Jul. 23, 2003 Publication • IP.com Prior Art Database Technical Disclosure Title: A Method to reuse base station antennas for the base station to radio network controller connection gathering First Failure Data Capture information.

Tao Cai et al.; "Coverage and Capactiy Optimization in E-UTRAN Based on Central Coordination and Distributed Gibbs Sampling"; 978-1-4244-2519-8/10; IEEE 71st Vehicular Tech. Conf. (VTC); 2010.

The NIST Definition of Cloud Computing (Draft)—Recommendations of the National Institute of Standards and Technology Peter Mell and Timothy Grance; pp. 1-7; Jan. 2011.

\* cited by examiner

ENHANCED RESOURCE MANAGEMENT FOR A NETWORK SYSTEM

STATEMENT OF GOVERNMENT INTEREST

This invention was made with Government support under Contract Number 60NANB10D003 awarded by National Institute of Standards and Technology (NIST). The Government has certain rights in this invention.

BACKGROUND

The present invention relates to wireless networks, and more specifically, to adaptive management of wireless network resources. A cellular network is a radio network distributed over selected areas called cells, each cell served by at least one fixed-location transceiver known as a base station. A radio network controller (RNC) may be used to communicate and control plurality of base stations. One or more RNCs communicates to a central server or core, which may provide a selected application for an end user. When joined together, the cells provide radio coverage over a wide geographic area. This enables portable transceivers or mobile devices, such as mobile phones, smart phones, camera phones, personal digital assistants (PDAs), tablets and laptop computers, to initiate or otherwise transmit a signal to the base station in order to initiate a call or data session and begin transmitting data. As more content is available on mobile devices, such as smart phones, and the number of these devices with increased content increases, bandwidth available to end users should be managed to ensure a satisfactory user experience.

Bandwidth availability between base stations and mobile devices is limited due to various factors, including a limited spectrum and prevalence of low-bandwidth microwave links. In some cases, bandwidth usage by selected mobile devices, called channels, may vary rapidly in a relatively short period of time. In cases where the bandwidth available is not sufficient to transmit the data provided by the server, the server is notified of data that was not transmitted, such as by receiving notice of lost packets. The bandwidth variation may change so frequently for these channels that the server cannot make accurate transmission adjustments after receiving notice of lost packets.

SUMMARY

According to exemplary embodiments, a method for resource management of network systems includes sampling channel states of a first set of channels from at least one base station associated with a radio network controller providing an application and estimating channel states of a second set of channels from the at least one base station, wherein the estimated channel states are based on previously sampled channel states and currently sampled channel states. The method further includes adapting at least one runtime parameter of the application based on the sampled channel states of the first set of channels and the estimated channel states of the second set of channels.

According to further exemplary embodiments, a computer program product for managing resources is provided that includes a computer readable storage medium having computer readable program code embodied therewith. The computer readable program code includes computer readable program code configured to sample channel states of a first set of channels from at least one base station associated with a radio network controller providing an application and estimate channel states of a second set of channels from the at least one base station, wherein the estimated channel states are based on previously sampled channel states and currently sampled channel states. The computer readable program code is also configured to adapt at least one runtime parameter of the application based on the sampled channel states of the first set of channels and the estimated channel states of the second set of channels.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
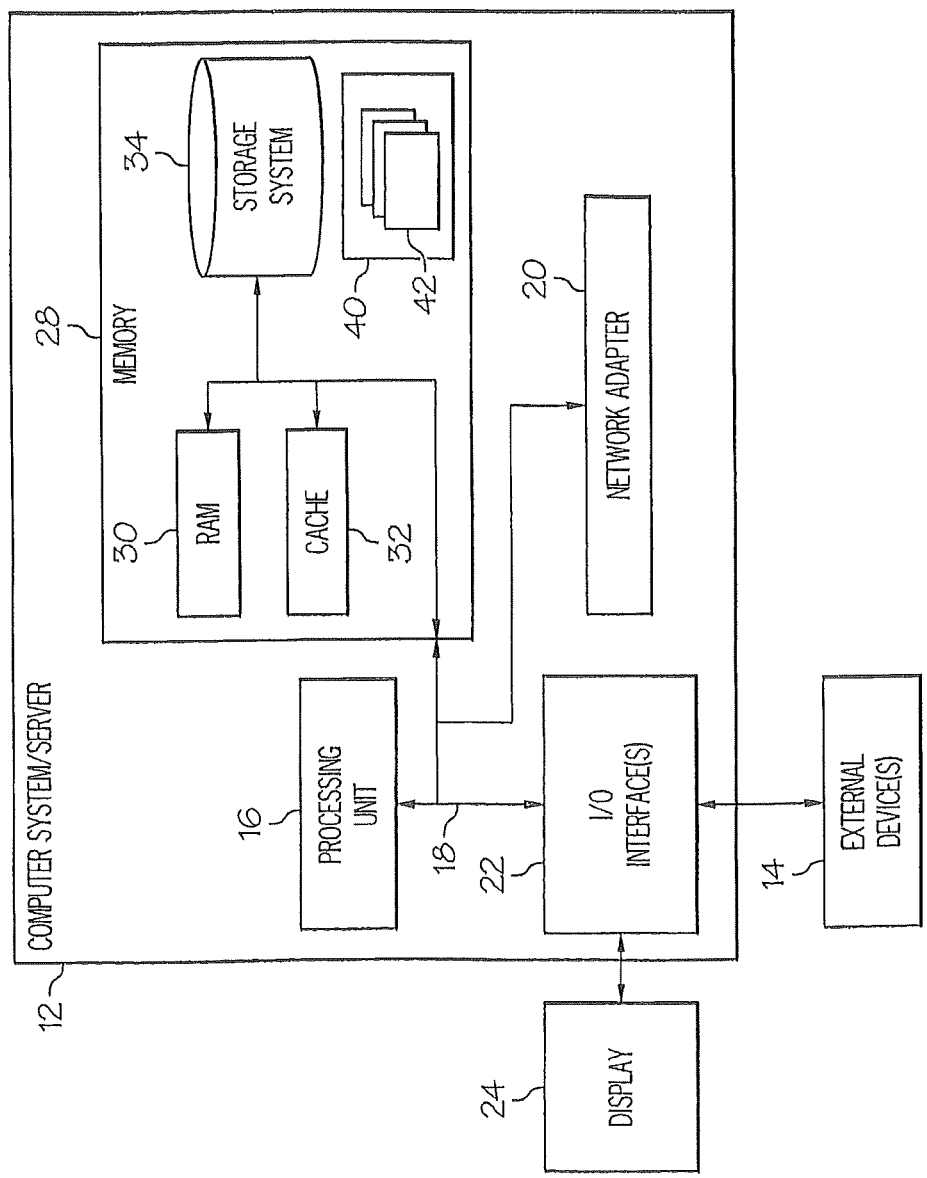
FIG. 1 illustrates a cloud computing node according to an embodiment of the present invention.

An embodiment of the present invention is directed to improving accuracy of bandwidth determinations while reducing costs (e.g., overhead, resource usage) of monitoring bandwidth. An embodiment includes base stations (BSs) configured to sample channel state information for each channel or mobile device associated with each BS. The channel states of a set of channels are communicated by the BSs to an associated radio network controller (RNC). In an embodiment, the set of channels that are sampled and provided to the RNC is a subset of all channels of the BSs associated with RNC. The subset is selected based on criteria, such as a determined variability or estimation error probability for the state of each channel. In an embodiment, the error probabilities in estimating channel states are used to indicate channels that are volatile or likely to change, and those channels are selected to be sampled. Accordingly, the channel states of the remaining channels are determined by estimating the channel states using a selected mathematical/statistical method, such as a likelihood estimator based on the learned channel state distribution. The estimation process can occur upstream of the BS, such as in the RNC or on a server providing one or more applications for the mobile device.

The sampled channel states and estimated channel states are then combined to provide a complete set of channel state information for the RNC. The RNC or server may then adapt one or more runtime parameter of the application for a mobile device based on the complete set of channel state information. The runtime parameter is adapted or adjusted to improve at least one objective function of the application, where the improved objective function enhances the application performance on the mobile device. The channel states of a plurality of channels are determined and the runtime parameter for each application on a mobile device is adapted. Accordingly, a plurality of applications and runtime parameters are adjusted by the application host (e.g., RNC or server). Embodiments use the combination of sampled and estimated channel states to reduce bandwidth usage in an upstream direction (from the BS to RNC) while also providing substantially real time information to improve resource utilization in a downstream direction (i.e. related to communication away from the server and toward the mobile devices). By sampling channel states in the BS, the information is provided in substantially real time fashion to improve accuracy while matching the application runtime parameters to the current conditions of the wireless channels to improve application performance on the mobile device.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
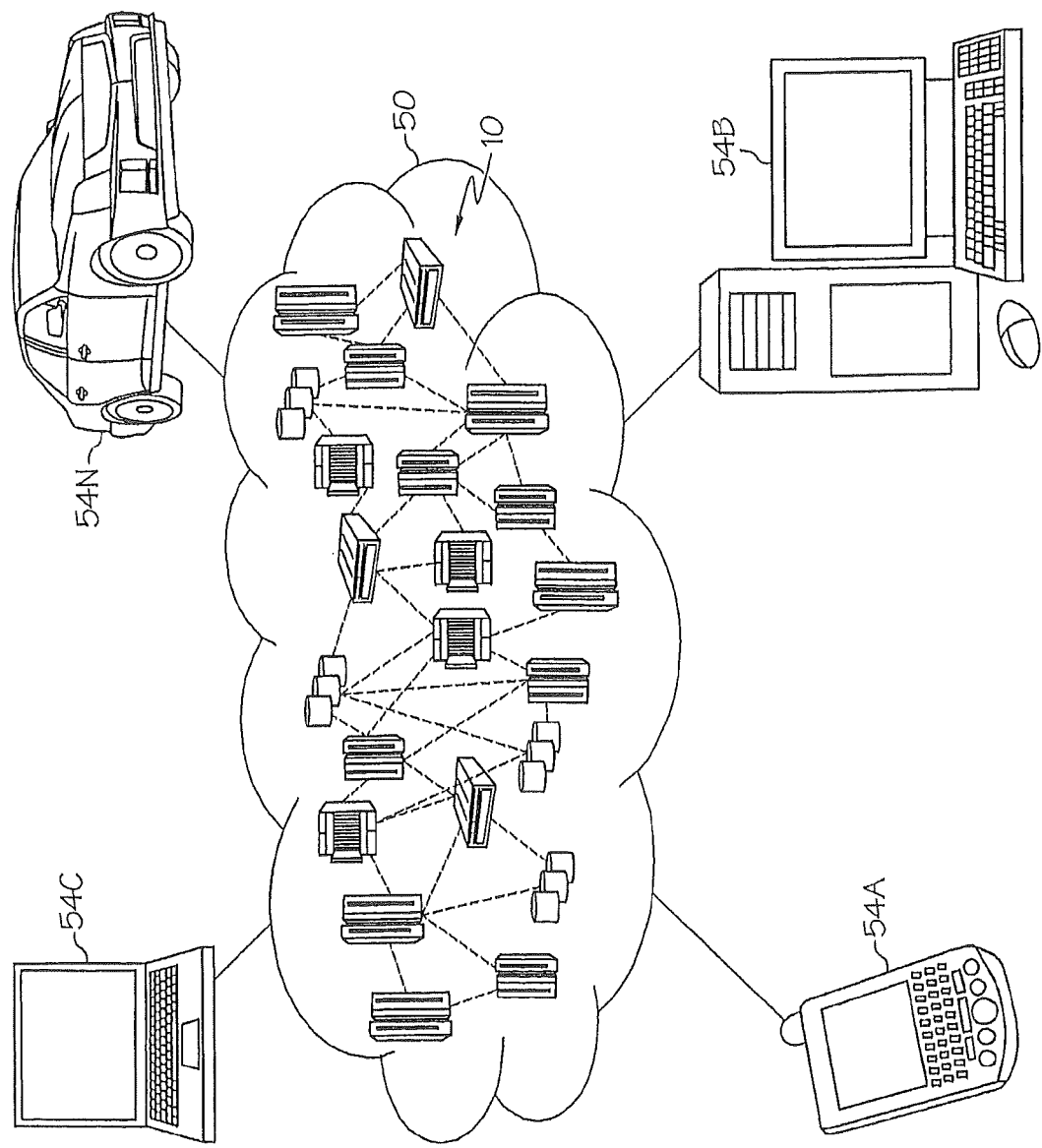
FIG. 2 illustrates a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
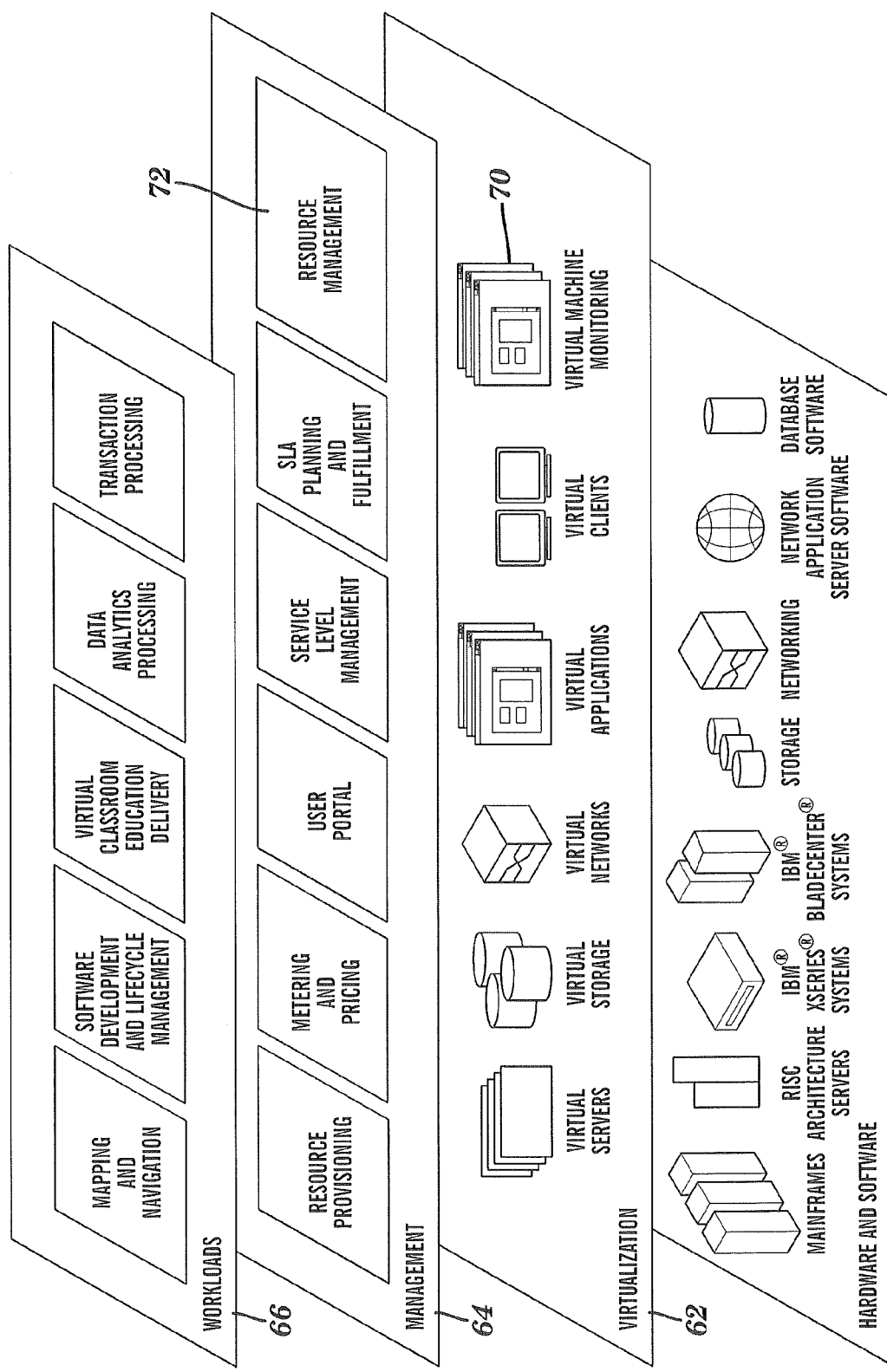
FIG. 3 illustrates abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data integration workflow processing.

Cloud computing is an attractive way to deliver services using a number of delivery models, e.g., as Software as a Service (SaaS), Platform as a Service (Paas), Infrastructure as a Service (IaaS) as mentioned above. Cloud computing is attractive since it simplifies management from the end user perspective and delivers efficiencies that come from pooling resources. One potential drawback of cloud computing is increased communication between the end-user terminal and the cloud computing infrastructure.

Increasingly, smartphones (i.e., mobile devices) are the terminals of choice through which the end users consume different cloud computing applications and services. The present invention can be used to deliver cloud services and applications to the smartphones (and other wireless devices connected through cellular infrastructure) in a more efficient manner by optimizing communication between the smartphones and cloud computing infrastructure. In a cellular network, the cloud computing infrastructure may be located in the base stations (BSs) to minimize latency between the end-user terminals and the cloud. Alternatively, the cloud computing infrastructure may be hosted in the physical space that houses aggregation points, radio network controller, or core network. In either case, the bandwidth between the smartphones and the BS and the bandwidth between the BSs and the radio network controller can be limited and needs to be carefully used to optimize the user experience and deliver high quality cloud computing applications and services. The present invention discloses a method in which applications are tuned to address the bottlenecks in different communication links based on the measurements available at the BS in such a manner that the benefits of doing so are improved and the cost of measurements are reduced. It is noted that the utility of the described embodiments are not limited to applications and services being delivered using the cloud computing model.

In one exemplary embodiment, a resource management application or module 72 in the management layer 64 implements the processes described herein; however, it will be understood that the application 72 may be implemented in any layer.

The resource management application 72 includes one or more algorithms or functions to implement embodiments described herein to determine resource usage for communication channels and allocate resources accordingly in the virtual environment. In an embodiment, the resource management application 72 along with other portions of management layer 64 and/or virtualization layer 62 are coupled to and/or reside in the memory 28 shown in FIG. 1. In addition, embodiments of the resource management application 72 include one or more program modules 42 of the program/utility 40 shown in FIG. 1. In a further embodiment, the resource management application 72 is part of the management layer 64 and is executed on hardware located in the hardware and software layer 60.

Figure 4:
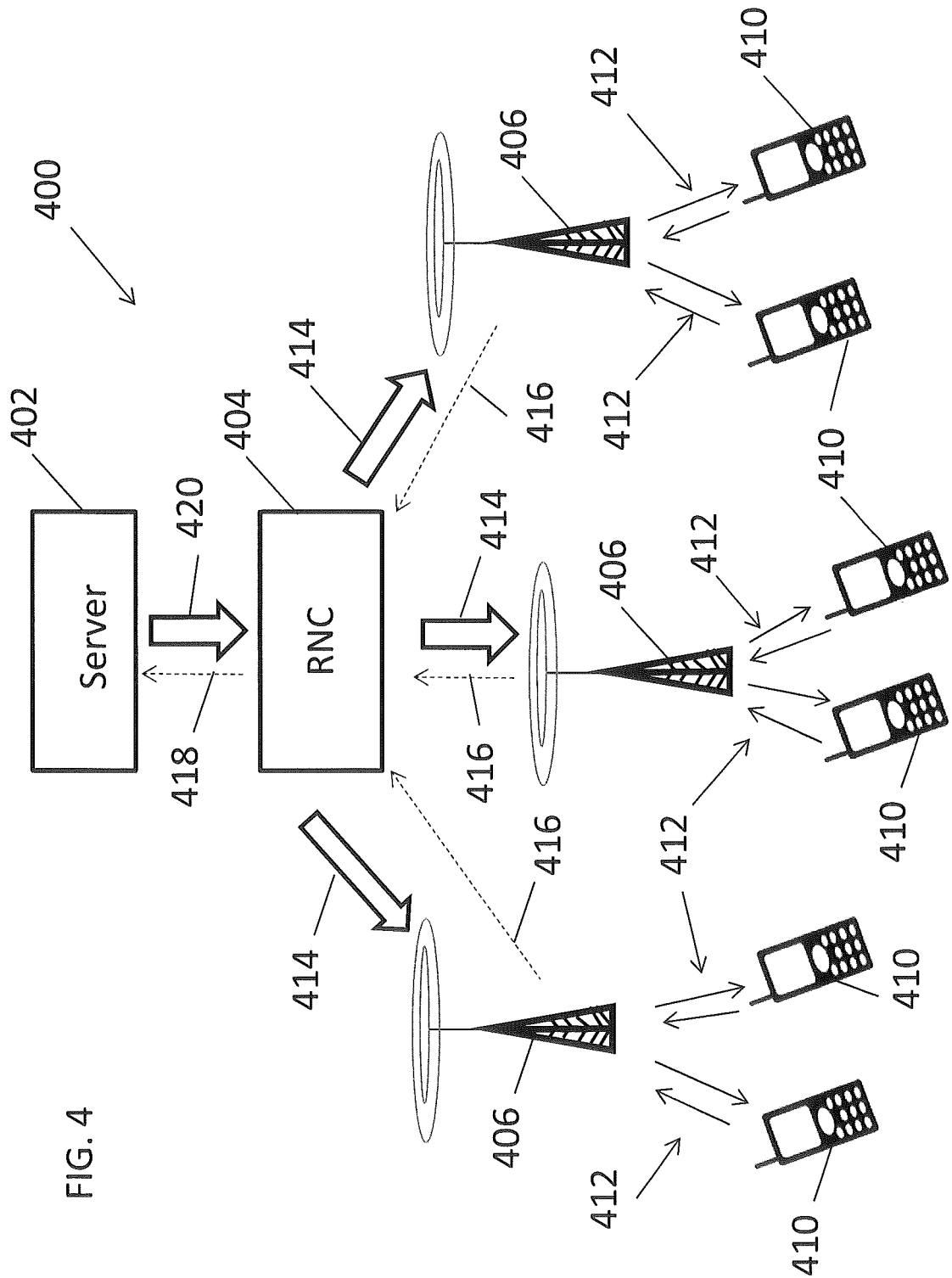
FIG. 4 illustrates a diagram of a network system in accordance with an embodiment of the present invention.

Turning now to FIG. 4, a diagram of a network system 400 in accordance with an embodiment is generally shown. The network system 400 includes a server 402 or core control which is associated with a plurality of radio network controllers (RNCs). The RNC 404 is associated with a plurality of base stations (BSs) 406 that correspond to respective cell areas, thereby providing service to mobile devices 410 in the network. For simplicity and ease of explanation the single RNC 404 is illustrated, but any number of RNCs may be connected to the server 402, wherein each RNC communicates with a plurality of BSs and each BS communicates with a plurality of mobile and pervasive computing devices. The mobile devices 410 communicate to their respective BS 406 via channels 412 to communicate to other mobile hand-held devices 410. Accordingly, each mobile device 410 has a corresponding channel 412 that provides data, information and/or applications requested by the mobile device 410. In embodiments, the application originates in the server 402 or RNC 404 and is communicated downstream (i.e., toward the device) to the mobile device 410 when requested. Delivery of the applications to the mobile devices 410 may utilize varying levels of bandwidth in each channel 412 depending on the application and/or properties of the application (e.g., bandwidth required) requested. Further, in an embodiment, the bandwidth available in each channel 412 at a particular moment in time may be limited based on signal strength, noise, fading, and interference due to other traffic and bandwidth consumption associated with the traffic to and from the BS 406.

In an embodiment, the BSs 406 are each configured to sample or measure bandwidth usage for each channel 412 at a high sampling rate, wherein the sampled bandwidth information for each channel is communicated as channel state information to the RNC 404. Communication from the BS 406 to the RNC 404 is represented by communication arrow 416, wherein the communication includes the channel state information for channels 412. Communication from the RNC 404 to the BS 406 is represented by communication arrow 414, where in the communication includes the application to be directed to the mobile devices 410 by channels 412. The application may be hosted by the RNC 404 or the server 402, wherein communication between the server 402 and the RNC 404 is represented by arrows 418 and 420. One example of an application hosted by the RNC 404 is data access (e.g., multimedia/file downloading or streaming) through an RNC 404 with caching capability, where the data can be directly served from the cache of the RNC 404 if there is a cache hit. By sampling the channel states at the BSs 406, channel state information (e.g., available bandwidth) is provided in a real time fashion to application hosts (e.g., the RNC 404 or server 402) which, in turn, can adapt runtime parameters of the application based on the channel state information. The real-time sampling enables the adaptation or adjustment to the runtime parameter without perceivable delay for the user application at the mobile device. In an embodiment, the BSs 406 may communicate available bandwidth channel state information for at least a portion of the channels 412 to the server 402 (via BSs 406 and RNC 404), wherein the server adjusts a runtime parameter such as data rate (i.e., amount of bandwidth consumed for an application) to match the channel state for each channel 412. Examples of channel state information also include but are not limited to delay and delay jittering. In an example, the application provided to the mobile device 410 is a video hosted by the server 402, wherein the server can transcode such that video quality (runtime parameter) is based on the available bandwidth (channel state). Other examples of runtime parameters include a size of a prefetch window for video streaming.

As depicted, a first set of the channel states are sampled at the BSs 406 and a second set of the channel states are estimated. The channels 412 to be sampled are selected based on determined parameters, such as a fluctuation in channel state information, including capacity of the channels. In one embodiment, the channels 412 with relatively high variability in channel states relative to other channels are sampled whereas the other channels with reduced or low variability have estimated channel states. In an embodiment, the channel states are estimated using statistical and/or mathematical methods based on previously sampled channel states as well as current channel states. Using the estimating methods, the error probability for estimating channel state information for each channel 412 is determined, wherein a relatively high error probability is an indicator of a relatively high variability that indicates the channel should be sampled. The previously sampled channel states used for estimation may be logged data from the BS 406 and mobile devices 410 or archived data from similar systems. Accordingly, in an embodiment, channel states for each channel 412 of the BS 406 are sampled and used to determine the channels for which sampled are reported or communicated to the RNC 404.

Any suitable statistical methods and tools may be used for estimating channel states and determining which channels are sampled, including, but not limited to, probability analysis/functions, statistical models, histograms, learned distribution and likelihood estimator/functions. After selecting the channels to be sampled, the method may also be used to estimate a series of channel states for a subset of or all channels of each BS. The channel states for sampled channels 412 are sampled at a selected rate to provide channel state information in substantially real time to the RNC 404 and/or server 402. In an example, the channel state of each channel is sampled at a rate of about 50 samples/second. In another example, the sampling rate is about 100 samples/second. Another exemplary BS 406 may sample channel states for selected channels 412 at about 5-100 samples/second. The number or quantity of channels selected for sampling may be subject to a constraint or limitation on the entire amount of sampled channel states from all the channels in communication with the RNC 404, or a separate constraint or limitation on the amount of sampled channel states from the channels associated with each BS 406. For example, the RNC (404) associated with 1000 mobile devices (410) via channels (412 and BSs 406) is limited to receiving channel state information from 300 of the channels at a given sampling rate due to bandwidth limitations. Accordingly, channel states for the remaining 700 channels are estimated using a selected method. In another embodiment, the RNC (404) associated with 1000 mobile devices (410) via 10 BSs (406), with 100 channels per BS, is limited to sampling 20 channel states for each BS. Thus, channel states for the remaining 80 channels (412) of each BS (406) are estimated using a selected method (where 200 channels are sampled and the remaining 800 are estimated). In one embodiment, channel states for each channel 412 in the system are sampled and a subset or portion of the sampled channels are reported or communicated to the RNC 404, while the BS 406 discards or aggregates the unreported samples for possible future use. In embodiments, channel state error probabilities for each channel are determined and compared to a threshold value to determine which channel states to report and which channel states values to estimate. In an embodiment, this process may occur at the BS 406 by a sampler or sample controller, enabling distributed processing of the method to improve performance. In another embodiment, a sample controller hosts the sampling and estimating decision process or logic.

The channels 412 to be sampled are selected based on the methods described above, such as using probability and/or likelihood functions to estimate channel states for each channel 412. In an embodiment, after estimating channel states for each channel, the error probability for each estimate is then determined, wherein a relatively high error probability indicates that the channel should be selected to be sampled. In an example, during an initialization step where no channel states have been sampled, the channel states for each channel 412 are sampled at least once and the channel states are processed to determine which channels to sample and which channels to estimate. In embodiments, the error probability is compared to a threshold value to determine if the channel 412 is to be sampled or estimated. In another embodiment, the error probabilities for all channels 412 (e.g., for the RNC 404 or each BS 406) are determined, where a selected number of channels with the largest error probabilities are selected for sampling. As discussed above, the sampling limitation may be imposed on the total number of channel states to be reported for all the channels associated with the RNC 404 or on the number of channel states to be reported for the channels associated with each BS 406. For example, when a limitation of only 20 of 100 channels are to be sampled and reported to the RNC, the 20 channels with highest error probabilities are selected for sampling and reporting. The channels 412 selected for sampling may be changed based on application specific factors, where the sampled channels are selected at an interval, such as a plurality of times per second, or are selected based on a triggering event, such as a change in estimated channel state values. By providing channel state information for all channels 412, but only utilizing bandwidth for communicating a subset of the total channels to the RNC 404, resources are managed and conserved. As discussed below with reference to FIGS. 6 and 7, the estimation and sampling control may occur in one or more location in the system, such as at BSs 406, RNC 404 and/or server 402.

Illustrated embodiments use channel state as an example of the information that is used for application optimization, but the resource management application and method applies to sampling and estimation of any rapidly changing information at BSs that is useful for optimizing application parameters. Examples of rapidly changing information that could be useful include mobile device key performance indicators, such as but not limited to, CPU, memory and battery levels.

In an embodiment, the estimation of channel state information is performed by the maximum likelihood estimator:

(estimated state of channel $i$)=$\max_j p_i(j)$, where $p_i(j)$ (j is any possible channel state) is the empirical distribution of the channel state for channel i, computed by $$p_i(j)=(\#\text{sampled state of channel } i \text{ is } j)/(\text{total \#sampling channel } i).$$

The sampling is performed by selecting channels, within the sampling constraint, to maximize:

$$\text{summation}_{\text{selected channel } i}(1-\max_j p_i(j)+\text{sqrt}(w^*\log(t)/m_i)),$$

where $\max_j p_i(j)$ is the largest empirical probability defined as in the maximum likelihood estimator above, sqrt(.) is the square root function, w is a design parameter, log(.) is the logarithmic function (natural log), t is the number of time steps elapsed since the beginning of sampling, $m_i$ is the number of times channel i is sampled. This sampling criterion allows the combination of: (a) sampling channels with large estimation error probability (i.e., $1-\max_j p_i(j)$ is large), and (b) sampling channels that are not sampled frequently enough (i.e., $m_i$ is small relative to log(t)). The design parameter w can be tuned to maximize the accuracy of estimation. In one embodiment where the sampler knows the minimum gap in estimation accuracy between the best and the second best sampling selections, D=sum(correct estimation probabilities under the best sampling selection)−sum(correct estimation probabilities under the second best sampling selection), the minimum gap in probability between the most likely and the second most likely channel states, E=$\min_{\text{channel } i}$ [probability (most likely state)−probability(second most likely state)]/2, and the maximum number of unsampled channels L, w is set as w=max(1, $D^2/(4E^2L^2)$). In another embodiment where D, E, or L is unknown, w is simply set as w=1.

Figure 5:
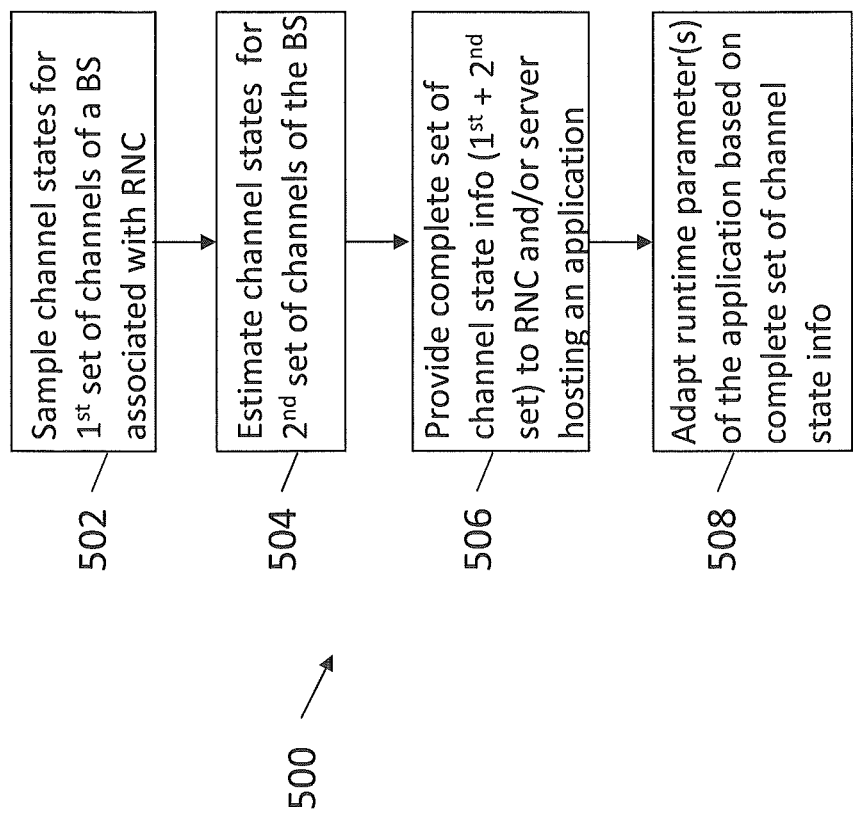
FIG. 5 illustrates a chart of a process for improved resource management in a network in accordance with an embodiment of the present invention.

FIG. 5 is a chart 500 of an exemplary process for improved resource management in a network, such as the network system 400 shown in FIG. 4. In block 502, channel states for a first set of channels of a base station (BS) at each BS associated with a radio network controller (RNC) are sampled. It should be understood that each BS associated with the RNC and a server may perform the depicted steps. In block 504, channel states for a second set of channels of the BS are estimated, wherein the first and second set combine to form the complete set of channels for each BS. In block 506, the complete set of channel states is provided to the RNC and/or server, wherein the RNC and server may host applications delivered to mobile devices via the channels. In block 508, one or more runtime parameters are adapted, changed or adjusted based on the complete set of channel states, wherein the change may include a change in application delivery, bit rate or bandwidth used for each application. The adapted parameter may improve an objective function of the application, such as increased speed for a download, reduced interruptions or errors in transmission, or improved quality of a video.

Figure 6:
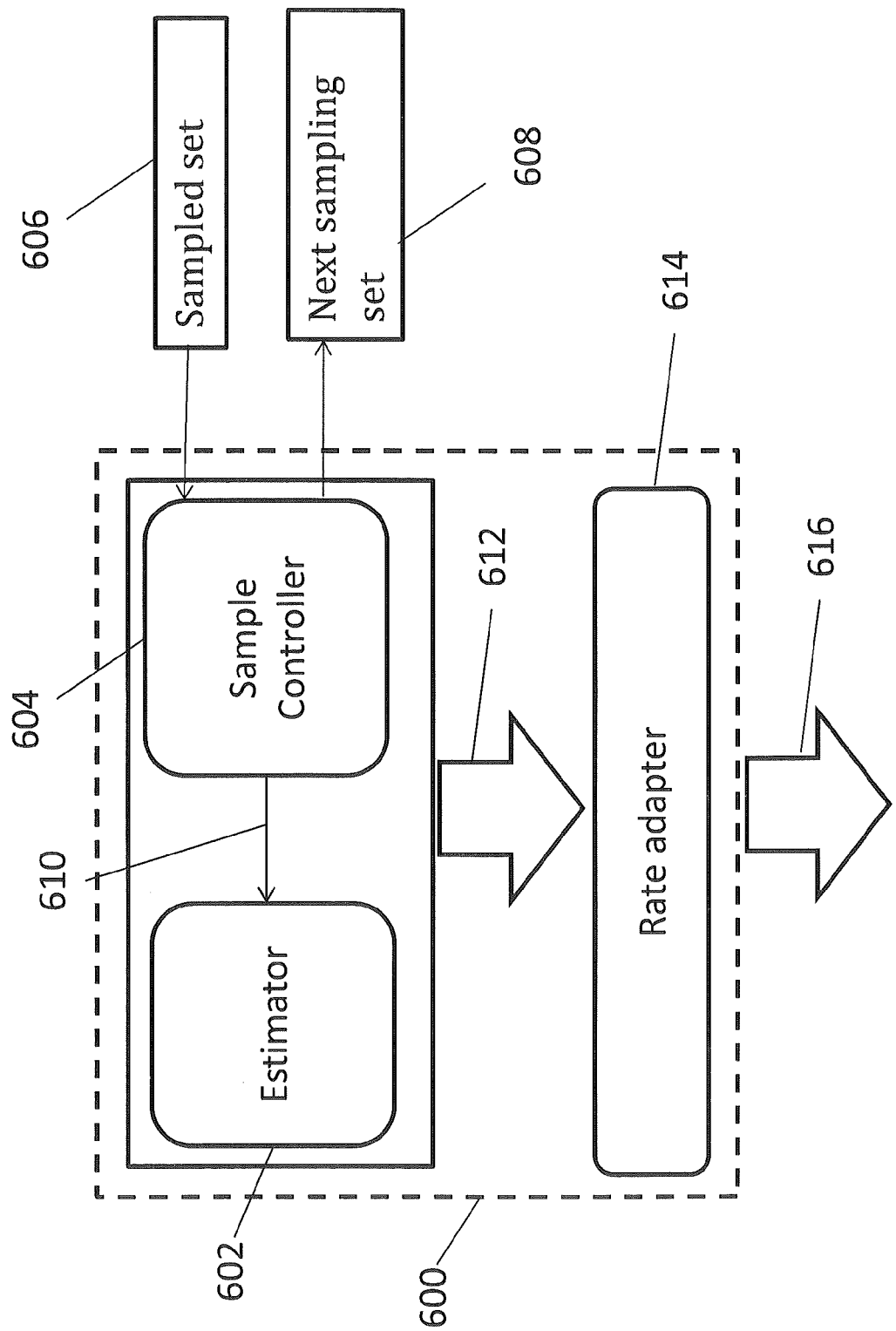
FIG. 6 illustrates a diagram of a portion of an exemplary network system including an RNC that includes an estimator and a sample controller in accordance with an embodiment of the present invention.

FIG. 6 is a diagram of a portion of an exemplary network system including an RNC 600 that includes an estimator 602 and a sample controller 604. The sample controller 604 receives a sampled set 606 of channel state information from each BS associated with the RNC 600. The sample controller 604 also sends a request 608 for the next set of channel states to sample, wherein the sample controller determines the channels to be sampled and estimated. The sample controller 604 provides sampled channel state information to the estimator 602, as shown by arrow 610, wherein the estimator estimates channel states for the remaining channels that are not reported in the samples. As shown by arrow 612, the complete set of channel states is provided to a rate adapter 614, wherein the rate adapter changes one or more runtime parameter, such as the bandwidth or bit rate, for each mobile user associated with each channel. An application is provided to each channel with the adapted parameter, as shown by arrow 616. In the depicted diagram, the RNC 600 hosts or provides the application from an associated server. In other embodiments, the RNC 600 hosts the application. The RNC 600 is configured to control the sampling and estimation processes, wherein the sample controller is used to determine which channels to sample, such as by using error probabilities. The RNC 600 may include selected software, hardware and processors to provide the described functionality.

Figure 7:
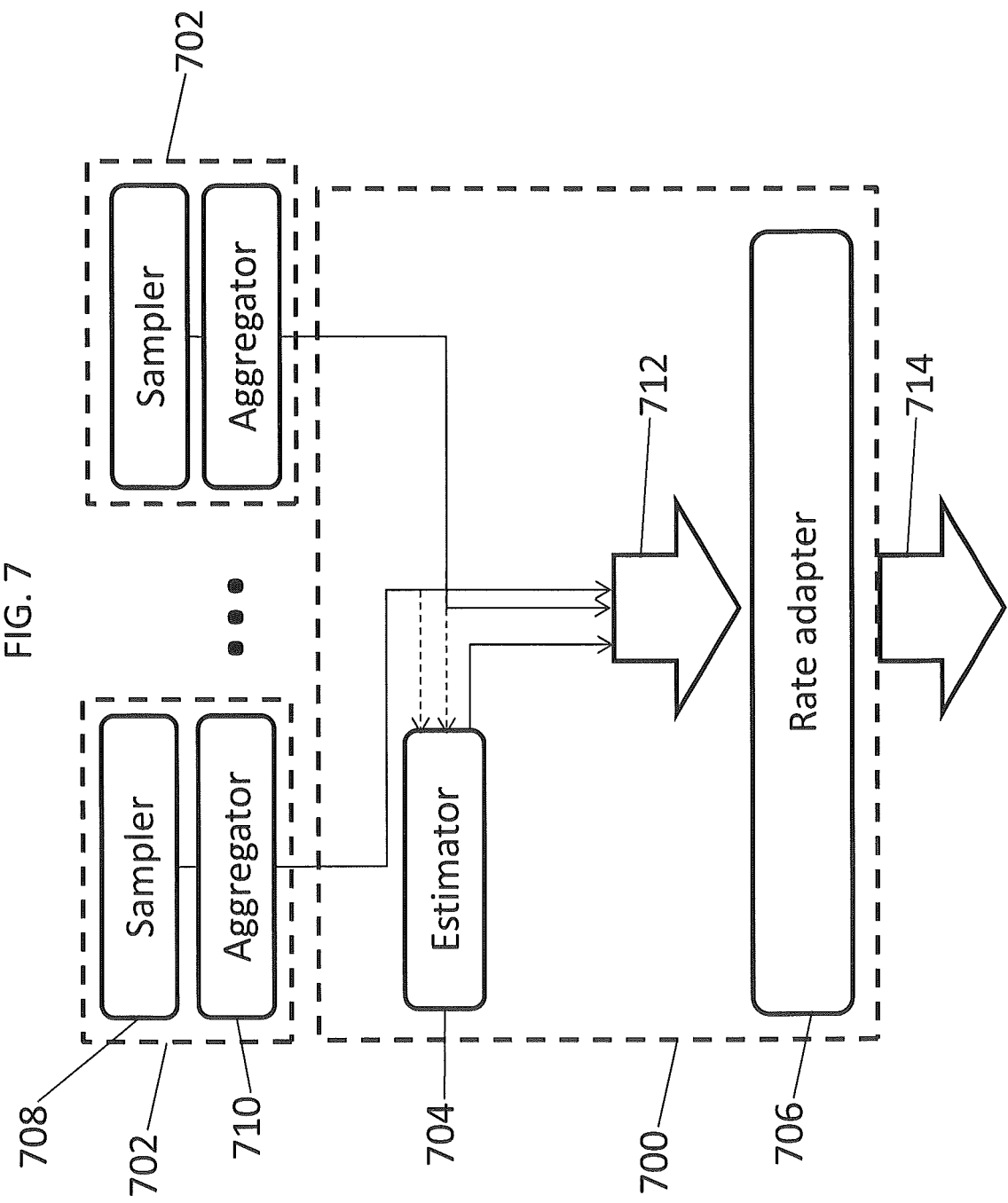
FIG. 7 illustrates a diagram of a portion of an exemplary network system including an RNC and a plurality of base stations in accordance with an embodiment of the present invention.

FIG. 7 is a diagram of a portion of an exemplary network system including an RNC 700 and a plurality of BSs 702. The RNC 700 includes an estimator 704 and a rate adapter 706 configured to adapt a runtime parameter of an application based on channel state information. The BSs 702 each include a sampler 708 configured to control channel state sampling for channels associated with the BS. In addition, the BSs 702 also include an optional aggregator 710 configured to accumulate and communicate channel state information to the estimator 704 according to the control of the sampler. In an embodiment, the sampler 708 samples each channel for each BS 702, but only reports or communicates a selected subset of the channels (i.e., the limited quantity or amount of sampled channels) to the RNC 700 in a substantially real time fashion. The aggregator 710 aggregates the unreported channel state information so as to communicate this information to the estimator 704 at a later time, such as when the next sample from this channel is reported. Therefore, the estimator 704 has improved estimation accuracy when estimating channel states due to the increased amount of information provided by the aggregate information. In arrow 712, the estimated channel states and sampled channel states are combined to provide a complete set of channel states in real time to the rate adapter 706. In arrow 714, the rate adapter 706 adapts one or more runtime parameter, such as the bandwidth or bit rate, for each channel to improve application performance on the corresponding mobile device.

Examples have been used herein to illustrate various methods and systems that may be used to enhance resource management for a network, such as a cellular network. It should be noted that methods and systems of combining sampled and estimated channel state information to adjust parameters may apply for communication between any suitable "nodes" (mobile device, BS, RNC, server) in the network system. For example, the channel state information for channels between BSs and RNCs (i.e., upstream or back endnodes) may be sampled and estimated in substantially real time, wherein the complete set of channel states is used to adapt runtime parameters of data and/or applications communicated between BSs and RNCs.

As discussed above, sampling, estimation, and application parameter optimization can be performed at various locations in the system, including but not limited to BSs, RNC, server, and any intermediate nodes in between that has information technology (IT) capability. The application can be run on any node in the system that has IT capability, including server, RNC, BSs and intermediate IT-capable nodes in the backhaul portion of the network system. Embodiments applies to nodes in the network as long as the points of obtaining the information (e.g., channel states) differ from the points of determining or applying application parameter optimization based on the obtained information. For example, the resource management application applies if the application is run locally at each BS, but the optimization of application parameters is performed deeper in the backhaul (e.g., upstream at the RNC)

due to computation complexity, need to jointly optimize across multiple BSs, or other technical and non-technical considerations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:
    sampling channel states of a first subset of a plurality of channels from at least one base station associated with a radio network controller that provides an application to produce sampled channel states;
    estimating channel states of a second subset of the plurality of channels from the at least one base station to produce estimated channel states,
    wherein the second subset of the plurality of channels are unreported channels, wherein the estimated channel states are based on the sampled channel states,
    wherein the estimating of the channel states of the second subset of the plurality of channels further comprises utilizing a likelihood estimator in accordance with an empirical distribution to estimate the channel states of the second subset of the plurality of channels,
    wherein the empirical distribution of the channel states of the second subset is computed dividing the sampled channel states by a total number of the plurality of channels; and
    adapting at least one runtime parameter of the application based on the sampled channel states and the estimated channel states.

2. The method of claim 1, wherein the sampling of the first subset of the plurality of channels comprises sampling channel states for each channel of the at least one base station at least once during initialization.

3. The method of claim 1, wherein the estimating of the second subset of the plurality of channels further comprises using one of a learned distribution and a likelihood estimator to estimate a series of channel states for each channel of the at least one base station.

4. The method of claim 1, wherein the adapting of the at least one runtime parameter further comprises adapting the at least one runtime parameter based on the sampled channel states and the estimated channel states to improve at least one objective function.

5. The method of claim 1, wherein the sampling of the first subset of the plurality of channels comprises sampling channel states at the at least one base station.

6. The method of claim 1, wherein the sampling of the first subset of the plurality of channels comprises determining an error probability during the estimating of the second subset of the plurality of channels for each channel of the at least one base station and selecting a first set of channels based on the determined error probabilities.

7. The method of claim 6, wherein the selecting of the first set of channels further comprises selecting the first set of channels based on the determined error probabilities and wherein the first set of channels satisfies a limitation on the total amount of sampled channels to be provided to the radio network controller.

8. The method of claim 6, wherein the selecting of the first set of channels further comprises selecting the first set of channels from a plurality of base stations based on the determined error probabilities, wherein the first set of channels comprise a third subset of channels from each of the plurality of base stations and the number of channels in the third subset satisfies a limitation on an amount of sampled channels to be provided from each of the plurality of base stations.

9. A computer program product for managing resources, the computer program product comprising a non-transitory computer readable storage medium having program instructions embodied therewith, the program instructions executable by a processor to cause the processor to:
    sample channel states of a first subset of a plurality of channels from at least one base station associated with a radio network controller that provides an application to produce sampled channel states;
    estimate channel states of a second subset of the plurality of channels from the at least one base station to produce estimated channel states,
    wherein the second subset of the plurality of channels are unreported channels,
    wherein the estimated channel states are based on the sampled channel states,
    wherein the estimation of the channel states of the second subset of the plurality of channels further comprises utilizing a likelihood estimator in accordance with an empirical distribution to estimate the channel states of the second subset of the plurality of channels,
    wherein the empirical distribution of the channel states of the second subset is computed dividing the sampled channel states by a total number of the plurality of channels; and
    adapt at least one runtime parameter of the application based on the sampled channel states and the estimated channel states.

10. The computer program product of claim 9, wherein the program instructions are further executable by the processor to cause the processor to sample the first subset of the plurality of channels for each channel of the at least one base station at least once during initialization.

11. The computer program product of claim 9, wherein the program instructions are further executable by the processor to cause the processor to estimate the second subset of the plurality of channels using one of a learned distribution and a likelihood estimator to estimate a series of channel states for each channel of the at least one base station.

12. The computer program product of claim 9, wherein the program instructions are further executable by the processor to cause the processor to adapt the at least one runtime parameter based on the sampled channel states and the estimated channel states to improve at least one objective function.

13. The computer program product of claim 9, wherein the at least one base station comprises a sampler configured to control the sampling of the first subset of the plurality of channels.

14. The computer program product of claim 9, wherein the program instructions are further executable by the processor to cause the processor to determine an error probability for channel states for each channel of the at least one base station and select the first set of channels based on the determined error probabilities.

15. The computer program product of claim 9, wherein the radio network controller comprises a sample controller configured to control the sampling of the first subset of the plurality of channels and further comprises an estimator configured to the estimating of the second subset of the plurality of channels.

16. A system comprising: a processor configured to:
sample channel states a first subset of a plurality of channels from at least one base station associated with a radio network controller that provides an application to produce sampled channel states;
estimate channel states of a second subset of the plurality of channels from the at least one base station to produce estimated channel states, wherein the second subset of the plurality of channels are unreported channels, wherein the estimated channel states are based on the sampled channel states,
wherein the estimation of the channel states of the second subset of the plurality of channels further comprises utilizing a likelihood estimator in accordance with an empirical distribution to estimate the channel states of the second subset of the plurality of channels,
wherein the empirical distribution of the channel states of the second subset is computed dividing the sampled channel states by a total number of the plurality of channels; and
adapt at least one runtime parameter of the application based on the sampled channel states and the estimated channel states.

17. The system of claim 16, wherein the processor is further configured to estimate channel states using one of a learned distribution and a likelihood estimator and estimate a series of channel states for each channel of the at least one base station.

18. The system of claim 16, wherein the processor is further configured to adapt the at least one runtime parameter based on the sampled channel states and the estimated channel states to improve at least one objective function.

19. The system of claim 16, wherein the processor is further configured to determine an error probability during the estimating of the second subset of the plurality of channels for each channel of the at least one base station and select a first set of channels based on the determined error probabilities.

20. The method of claim 1, wherein the estimating of the second subset of the plurality of channels further comprises utilizing a likelihood estimator in accordance with an empirical distribution.

* * * * *